United States Patent
Li et al.

(10) Patent No.: US 10,636,164 B2
(45) Date of Patent: Apr. 28, 2020

(54) OBJECT DETECTION METHOD AND APPARATUS BASED ON DYNAMIC VISION SENSOR (71) Applicant: SAMSUNG ELECTRONICS CO., LTD., Suwon-si (KR)

(72) Inventors: Jia Li, Beijing (CN); Qiang Wang, Beijing (CN); Feng Shi, Beijing (CN); Deheng Qian, Beijing (CN); Dongqing Zou, Beijing (CN); Hyunsurk Eric Ryu, Hwaseong-si (KR); JinMan Park, Yongin-si (KR); Jingtao Xu, Beijing (CN); Keun Joo Park, Seoul (KR); Weiheng Liu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 15/813,668

(22) Filed: Nov. 15, 2017

(65) Prior Publication Data
US 2018/0137647 A1 May 17, 2018

(30) Foreign Application Priority Data
Nov. 15, 2016 (CN) .......................... 2016 1 1033463

(51) Int. Cl.
G06T 7/73 (2017.01)
G06T 7/11 (2017.01)
G06K 9/66 (2006.01)
G06K 9/46 (2006.01)
G06K 9/62 (2006.01)
(Continued)

(52) U.S. Cl.
CPC ............ *G06T 7/73* (2017.01); *G06K 9/00805* (2013.01); *G06K 9/4628* (2013.01); *G06K 9/4671* (2013.01); *G06K 9/6274* (2013.01); *G06K 9/66* (2013.01); *G06T 7/11* (2017.01); *G06N 3/0445* (2013.01); *G06T 2210/12* (2013.01)

(58) Field of Classification Search
CPC ......... G06T 7/73; G06T 7/11; G06K 9/00805; G06K 9/4628; G06K 9/4671; G06K 9/6274; G06K 9/66
See application file for complete search history.

(56) References Cited

U.S. PATENT DOCUMENTS 8,582,822 B2 11/2013 Iwasaki et al.
9,177,228 B1* 11/2015 Khosla .................. G06K 9/629
(Continued)

FOREIGN PATENT DOCUMENTS

KR 10-2016-0087738 A 7/2016

*Primary Examiner* — Kim Y Vu
*Assistant Examiner* — Molly Delaney
(74) *Attorney, Agent, or Firm* — Sughrue Mion, PLLC (57) ABSTRACT The disclosure provides an object detection method and apparatus based on a Dynamic Vision Sensor (DVS). The method includes the following operations of: acquiring a plurality of image frames by a DVS; and, detecting the image frames by a recurrent coherent network to acquire a candidate box for objects to be detected, wherein the recurrent coherent network comprising a frame detection network model and a candidate graph model. By using a new recurrent coherent detection network, a bounding box for an object to be detected is fast detected from the data acquired by a DVS. The detection speed is improved greatly while ensuring the detection accuracy.

16 Claims, 10 Drawing Sheets (51) Int. Cl.
*G06K 9/00* (2006.01)
*G06N 3/04* (2006.01)

(56) References Cited

U.S. PATENT DOCUMENTS

| | | |
|---|---|---|
| 9,208,385 B2 | 12/2015 | Fleites et al. |
| 9,275,308 B2 | 3/2016 | Szegedy et al. |
| 10,133,951 B1 * | 11/2018 | Mendonca ............. G06K 9/325 |
| 2011/0255747 A1 | 10/2011 | Iwasaki et al. |
| 2015/0030202 A1 * | 1/2015 | Fleites ............... G06K 9/00711 |
| | | 382/103 |
| 2015/0170002 A1 | 6/2015 | Szegedy et al. |
| 2016/0092736 A1 * | 3/2016 | Mai .................... G06K 9/00624 |
| 2016/0104058 A1 | 4/2016 | He et al. |
| 2016/0155436 A1 * | 6/2016 | Choi .................... G10L 15/183 |
| | | 704/232 |
| 2016/0180195 A1 | 6/2016 | Martinson et al. |
| 2019/0034558 A1 * | 1/2019 | Leeman-Munk ... G06F 3/04842 |

* cited by examiner

| Network structure | Model size | Accuracy | Speed (ms/frame) |
|---|---|---|---|
| VGG16 | 512MB | 96.2% | 6692 |
| ZF | 230MB | 95.0% | 835 |
| Complete detection network | 2.27MB | 95.1% | 7.8 |
| Recurrent coherent network | 3.57MB | 95.3% | 6.4 |

OBJECT DETECTION METHOD AND APPARATUS BASED ON DYNAMIC VISION SENSOR

CROSS-REFERENCE TO RELATED APPLICATIONS

This application claims the benefit of Chinese Patent Application No. 201611033463.3 filed on Nov. 15, 2016, in the State Intellectual Property Office of the People's Republic of China, the disclosure of which is incorporated herein in its entirety by reference.

TECHNICAL FIELD

Exemplary embodiments relate to the computer vision field, and in particular to an object detection method and apparatus based on a dynamic vision sensor.

BACKGROUND ART

Object detection becomes a hot topic in the computer vision field, and is aimed at recognizing and detecting each object instance of a category of interest in an image or a video. The object detection is an important part in various applications such as automatic driving, unmanned aerial vehicles and gesture-based interaction systems. A highly efficient camera, a real-time vision processing algorithm based on an embedded high power efficient processor and the stable performance all are critical to the practical application of object detection.

In many important application scenarios such as automatic driving, unmanned aerial vehicles, family assistances and gesture-based man-machine interaction, the object detection technologies play a core role. Conventional object detection methods use a variable component model and variants thereof as a mainstream. In such methods, by using image descriptors such as Histogram of Oriented Gradient (HOG), Scale-Invariant Feature Transform (SIFT) and Local Binary Patterns (LBP) as features, the whole image is traversed by a sliding window to find a maximum response region of a certain category.

Recently, with the rapid development of the deep learning technology, the object detection technologies based on deep neural networks have become mainstream technical methods in this field due to their remarkable performance. At present, majority of the object detection technologies based on deep neural networks are established under the framework of a Faster Region Convolutional Neural Network (FRCNN): first, a serial of convolution operations are performed on an input image to obtain a feature map; then, according to the position and scale of a Region of Interest (ROI) in the feature map, a feature having a fixed length is dynamically pooled from the image feature map as the feature of this ROI; and finally, an object in the ROI is classified by using the feature of the ROI and a bounding box for this object is regressed.

Although such methods based on convolutional neural networks have excellent detection performance, the methods are generally run on a GPU only since a large amount of storage spaces and computing resources are required. Consequently, the requirements of applications of embedded electronic apparatuses cannot be satisfied.

In order to increase the speed of the detection algorithm, there are some more efficient network structures. In such methods, instead of depending on the ROI-based dynamic pooling, an object is directly classified by the feature of each point in an image feature map, and parameters for a bounding box for this object are regressed. Compared with the FRCNN detection model, such methods can increase the speed by 2.5 times while ensuring the accuracy, or increase the speed by 8.6 times while reducing the accuracy by about 10%. Despite this, there is still a gap of dozens of times from the requirements of the high-efficient embedded applications.

For the practical applications such as automatic driving, unmanned aerial vehicles, family assistances and gesture-based interaction systems, high power efficiency is the prerequisite for the extensive use of the object detection algorithm. However, although the detection methods based on convolutional neural networks have excellent detection performance, the methods are generally run on a GPU only since a large amount of storage spaces and computing resources are required. Consequently, the requirements of applications of embedded electronic apparatus cannot be satisfied.

A Dynamic Vision Sensor (DVS) camera has the characteristic of high power efficiency. However, since the existing object detection algorithms based on neural networks are all high in complexity, the power consumption of the whole vision detection system is still very high. As a result, the requirements of the practical applications cannot be satisfied.

Unlike the images generated by a conventional Complementary Metal Oxide Semiconductor (CMOS) or Charge-coupled Device (CCD) sensor, a DVS sensor generates events according to the change in illumination intensity in a scene, and the generated images have the characteristics of sparsity and binarization.

SUMMARY

An aspect is to provide an object detection method according to the characteristics of a DVS camera and in combination with temporal information, in order to improve the efficiency of object detection.

For this purpose, an exemplary embodiment provides an object detection method based on a Dynamic Vision Sensor (DVS), including the following operations of: acquiring a plurality of image frames by a DVS; and detecting the image frames by a recurrent coherent network to acquire a candidate box for objects to be detected, wherein the recurrent coherent network including a frame detection network model and a candidate graph model.

Specifically, the frame detection network model generates, based on a feature map of the current frame image and a temporal coherent candidate box of a previous frame image generated by the candidate graph model, a candidate detection box of the current frame image.

Wherein, the frame detection network model includes a complete detection network and a shortcut detection network.

Further, the execution operation of generating a candidate detection box of the current frame image by the frame detection network model includes: processing the current frame image by three convolutional layers from the first to third convolutional layers of the complete detection network; by using feature maps of the current frame image and the previous frame image in the third convolutional layer and a result of detection of the previous frame image as an input, performing a processing operation of the shortcut detection network; and if a confidence value predicted by a softmax layer in the shortcut detection network is less than a threshold value, continuously performing or resuming the processing operation of the complete detection network from the third convolutional layer, and using an output of the complete detection network as an output of the frame detection network.

Optionally, if the confidence value predicted by the softmax layer in the shortcut detection network is greater than the threshold value, a result from the shortcut detection network is used as the output of the frame detection network.

Specifically, the processing operation of the shortcut detection network includes: connecting feature map of the previous frame image and the current frame image in series to obtain an updated feature map of the current frame image; using a region of the candidate detection box of the previous image as a Region of Interest (ROI), and pooling a feature vector of this ROI from the updated feature map by an ROI pooling layer; and processing the feature vector of the ROI to obtain detection information.

Specifically, the processing operation of the complete detection network includes: processing the current frame image by a plurality of convolutional layers and a pooling layer to obtain a feature map of the current frame image; based on the feature map of the current frame image, regressing the feature map of the current frame image by a Region Proposal Network (RPN) to obtain a candidate box for the current frame image; processing the regressed candidate box for the current frame image by a non-maximum suppression algorithm to obtain proposal ROIs; dynamically pooling the feature map of the current frame image by the ROI pooling layer to obtain feature vectors of the proposal ROIs; and processing the feature vector of each proposal ROI to obtain detection information.

Preferably, but not necessarily, each of the dynamically pooled feature vectors of the proposal ROIs has a fixed length.

Specifically, the detection information includes parameters for describing the candidate detection box and classification identifier information of the objects to be detected.

Specifically, the parameters for describing the candidate detection box and the classification identifier information of the objects to be detected are obtained by processing the feature vector of each proposal ROI, after through a fully-connected layer, by a bounding box regression layer and the softmax layer respectively.

Specifically, the candidate graph model establishes a graph model based on candidate detection boxes at each time step, and uses a candidate detection box satisfying a temporal coherency constraint among the candidate detection boxes as a temporal coherent candidate box for the current frame image.

Wherein, the candidate graph model includes a plurality of graph layers, each of which corresponds to a frame image.

Specifically, the temporal coherency constraint means that a distance between a position, e.g., a previous position, of an object to be detected at a previous time step and a position, e.g., a current position, of the object to be detected at the current time step is less than a first preset threshold value.

Preferably, but not necessarily, the distance is a Euclidean distance or a Manhattan distance.

Specifically, when there is a temporal trajectory having a length greater than a second preset threshold value in a candidate detection box, this candidate detection box satisfies the temporal coherency constraint.

Another exemplary embodiment provides an object detection apparatus based on a DVS, including: an acquisition module configured to acquire a plurality of image frames by a DVS; and a detection module configured to detect the image frames by a recurrent coherent network to acquire a candidate box for objects to be detected, wherein the recurrent coherent network including a frame detection network model and a candidate graph model.

In yet another exemplary embodiment, there is an object detection method based on a Dynamic Vision Sensor (DVS) including: acquiring a plurality of image frames by the DVS; and detecting the plurality of image frames by a recurrent coherent network to acquire a candidate detection box for objects to be detected, wherein the recurrent coherent network includes a frame detection network model and a candidate graph model.

In one exemplary embodiment, there is an object detection apparatus based on a Dynamic Vision Sensor (DVS), the object detection apparatus including: at least one processor configured to implement: an acquisition module configured to acquire a plurality of image frames by the DVS; and a detection module configured to detect the plurality of image frames by a recurrent coherent network to acquire a candidate box for objects to be detected, wherein the recurrent coherent network includes a frame detection network model and a candidate graph model.

Compared with the related art, the solutions of the exemplary embodiments have the following aspects: in the exemplary embodiment, by using a novel recurrent coherent detection network, a bounding box for an object to be detected is fast detected from the data acquired by a DVS. The detection speed is improved greatly while ensuring the detection accuracy.

Additional aspects of the exemplary embodiments will be partially appreciated and become apparent from the description below, or will be well learned from the exemplary embodiments.

BRIEF DESCRIPTION OF DRAWINGS

The above and/or additional aspects of the exemplary embodiments will become apparent and be more readily appreciated from the following descriptions, with reference to the accompanying drawings, in which:

FIG. 3 is a basic composition diagram of;

DETAILED DESCRIPTION OF THE EXEMPLARY EMBODIMENTS

Exemplary embodiments will be described in detail hereinafter. The examples of these exemplary embodiments have been illustrated in the accompanying drawings throughout which same or similar reference numerals refer to same or similar elements or elements having same or similar functions. The embodiments described with reference to the accompanying drawings are illustrative, merely used for explaining the exemplary embodiment and should not be regarded as any limitations thereto.

Figure 1:
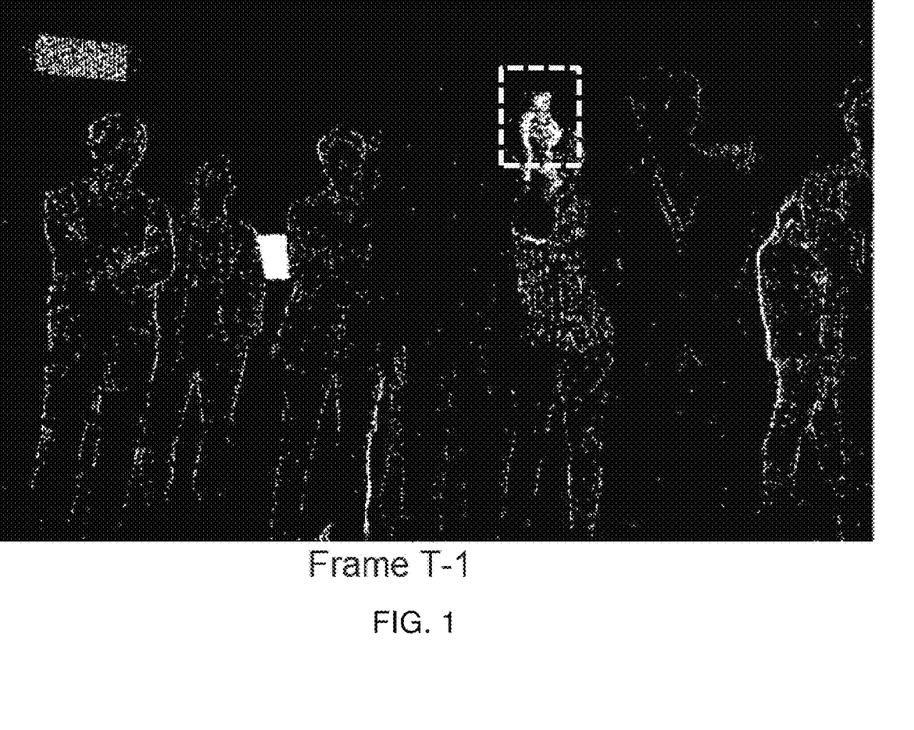
FIG. 1 is an exemplary view of a DVS image in a frame T−1.
Figure 2:
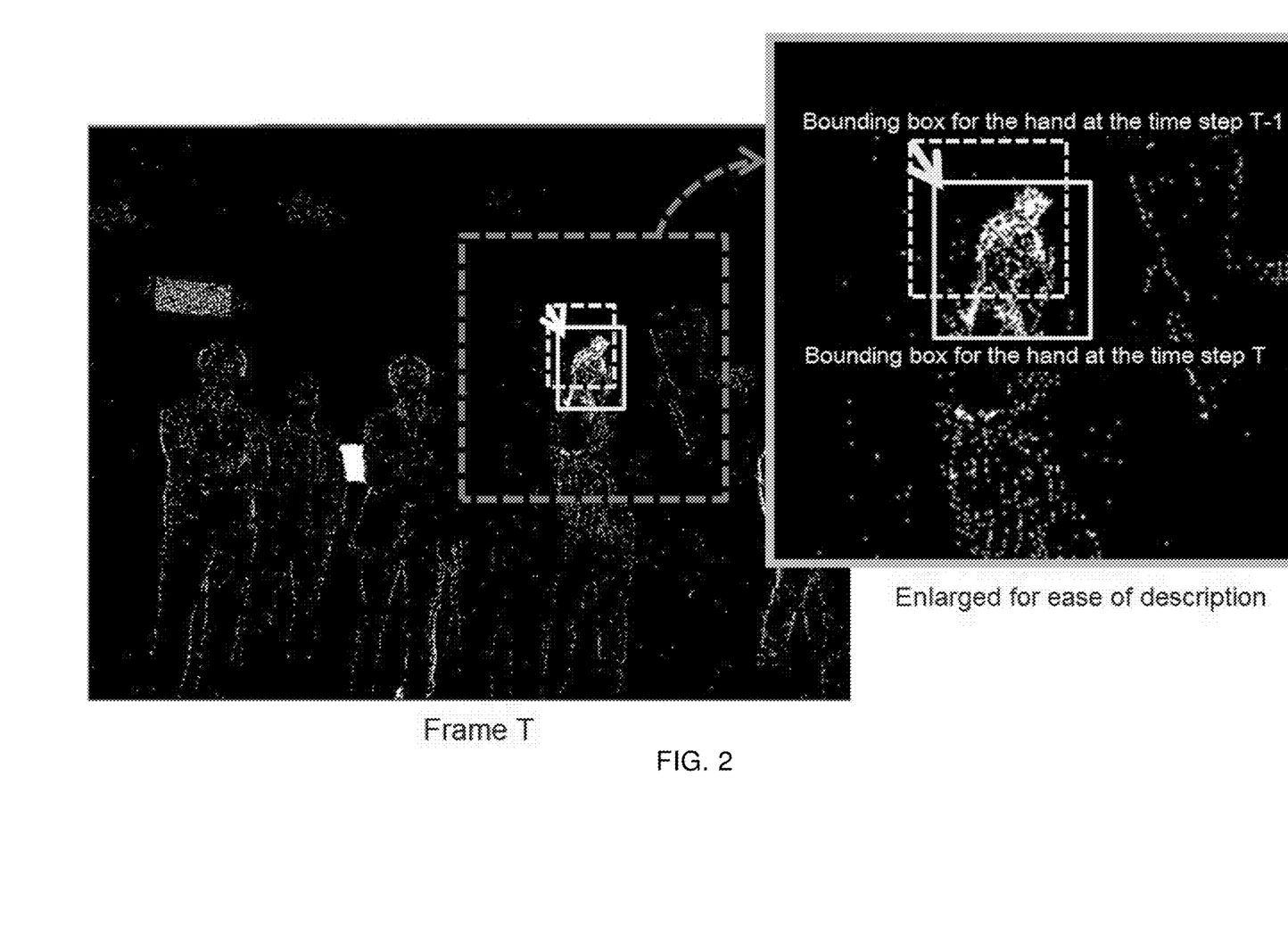
FIG. 2 is an exemplary view of a DVS image in a frame T.

Compared with a conventional camera based on a CMOS/CCD sensor, a DVS camera has the characteristic of low power consumption; meanwhile, a DVS sensor is a motion-sensitive sensor, and captures only boundary or outline events of an object, which has a relative motion and a change in illumination reaching a certain threshold value. Therefore, the images generated by the DVS camera have the characteristics of sparsity and binarization. Due to the characteristics of sparsity and binarization of the DVS data, the exemplary embodiment provides a light-weight detection network model with a low computation cost, in order to save the computation overhead and improve the computation efficiency. FIGS. 1 and 2 show two frame exemplary views of DVS images, wherein the white dashed box represents a bounding box for a hand in a T−1 frame image and the white solid box represents a bounding box for the hand in a T frame image.

Figure 3:
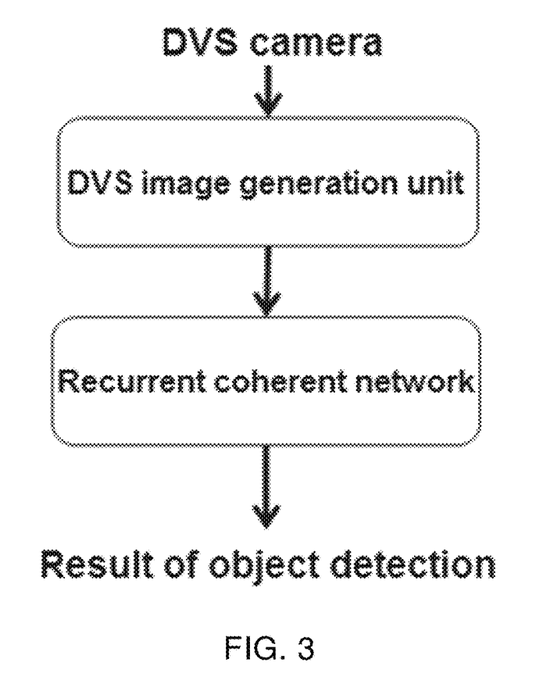

For the object detection in a video, a great amount of temporal information in the video can be utilized in addition to the spatial information contained in each frame, so that the detection speed is further accelerated. As shown in FIGS. 1 and 2, the same object in the two adjacent frames should have temporal coherency. In other words, there is only a limited offset between the bounding box for the previous frame and the bounding box for the following frame. Based on this, the exemplary embodiment provides a novel object detection method. FIG. 3 shows a basic composition diagram. As shown, a video data stream is captured by a DVS camera; then, the captured video data stream is converted into a plurality of image frames by an image generation unit of the DVS camera; and, the image frames are detected by a recurrent coherent network to obtain a result of detection of objects in the image frames.

Embodiment 1

Figure 4:
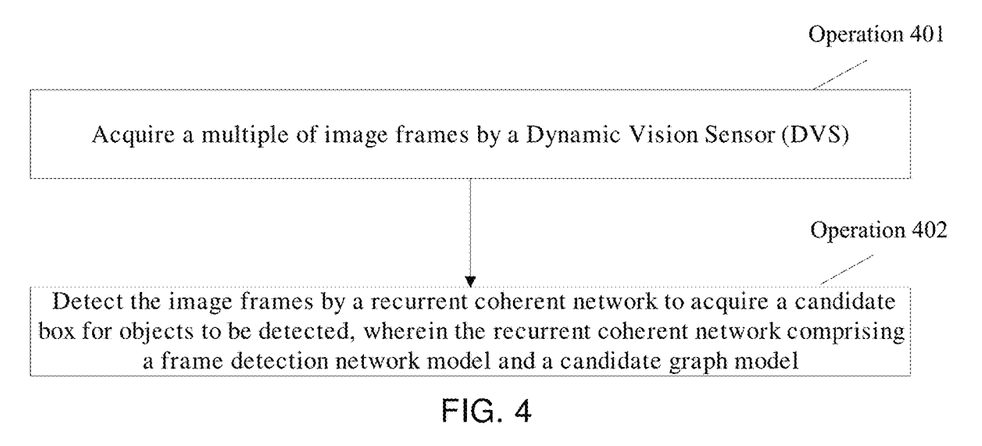
FIG. 4 is a schematic flowchart of an object detection method based on a DVS according to an exemplary embodiment.

As shown in FIG. 4, an exemplary embodiment provides an object detection method based on a DVS. The temporal information is fused by a novel recurrent coherent network structure, so that the detection speed is accelerated and the detection stability is improved. An exemplary embodiment of the method includes the following operations.

Operation 401: A plurality of image frames are acquired by a DVS.

The DVS captures a video data stream, and the captured video data stream is converted into images in frames one after another by an image generation unit of the DVS to obtain a plurality of image frames, where each image frame corresponds to an image in the video data stream at one time step. The plurality of image frames are used as an input of a recurrent coherent network, so that the image frames are detected by the recurrent coherent network.

Operation 402: The image frames are detected by a recurrent coherent network to acquire a candidate detection box for objects to be detected, wherein the recurrent coherent network includes a frame detection network model and a candidate graph model.

Figure 5:
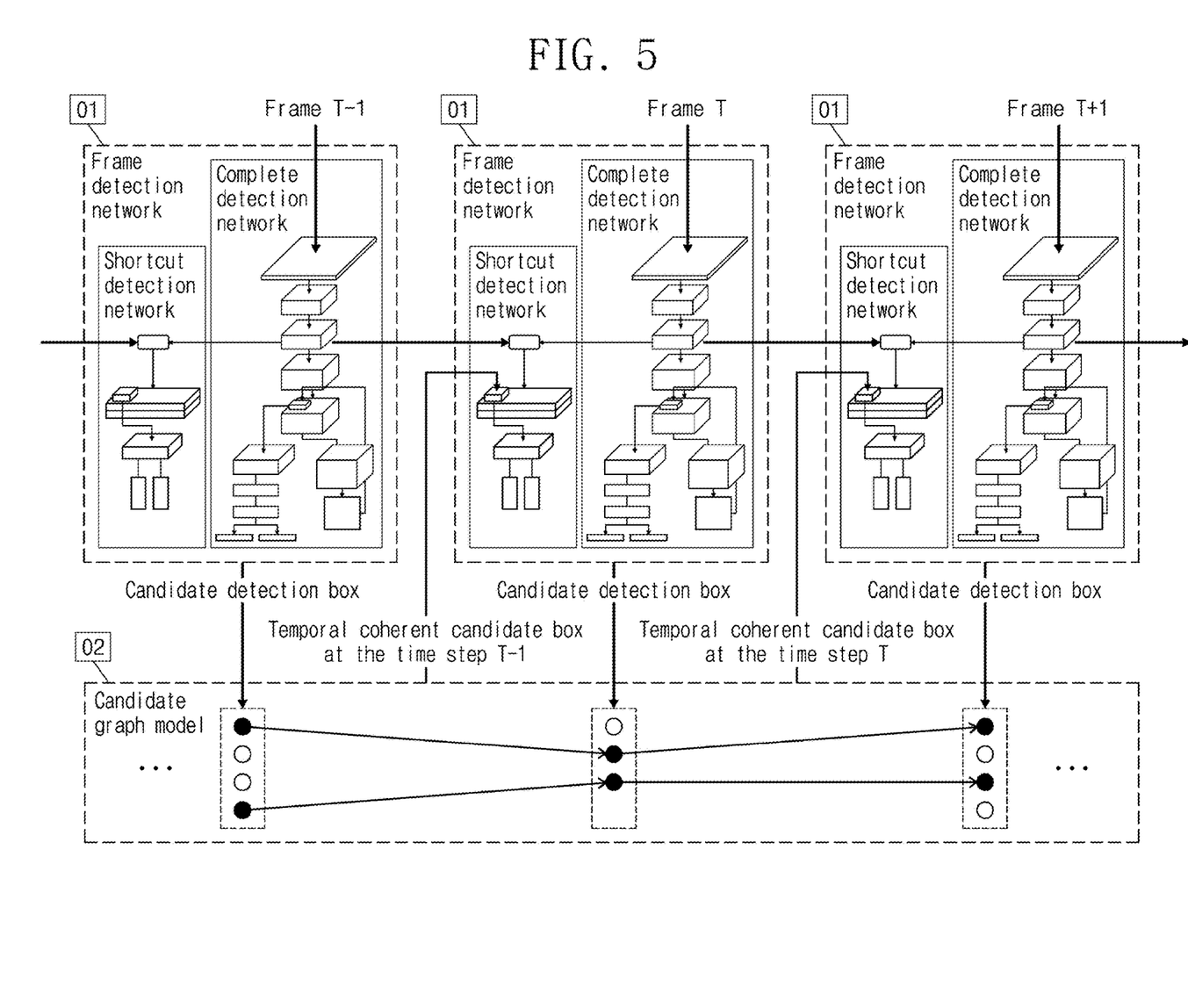
FIG. 5 is a structural block diagram of the recurrent coherent network according to the exemplary embodiment.

The recurrent coherent network is used for detecting the image frames input in the operation 401 to acquire a candidate detection box of objects to be detected. As shown in FIG. 5, the recurrent coherent network includes a frame detection network model and a candidate graph model, wherein the frame detection network model is located in a unit numbered by 01 in FIG. 5, and the candidate graph model is located in a unit numbered by 02 in FIG. 5.

Figure 6:
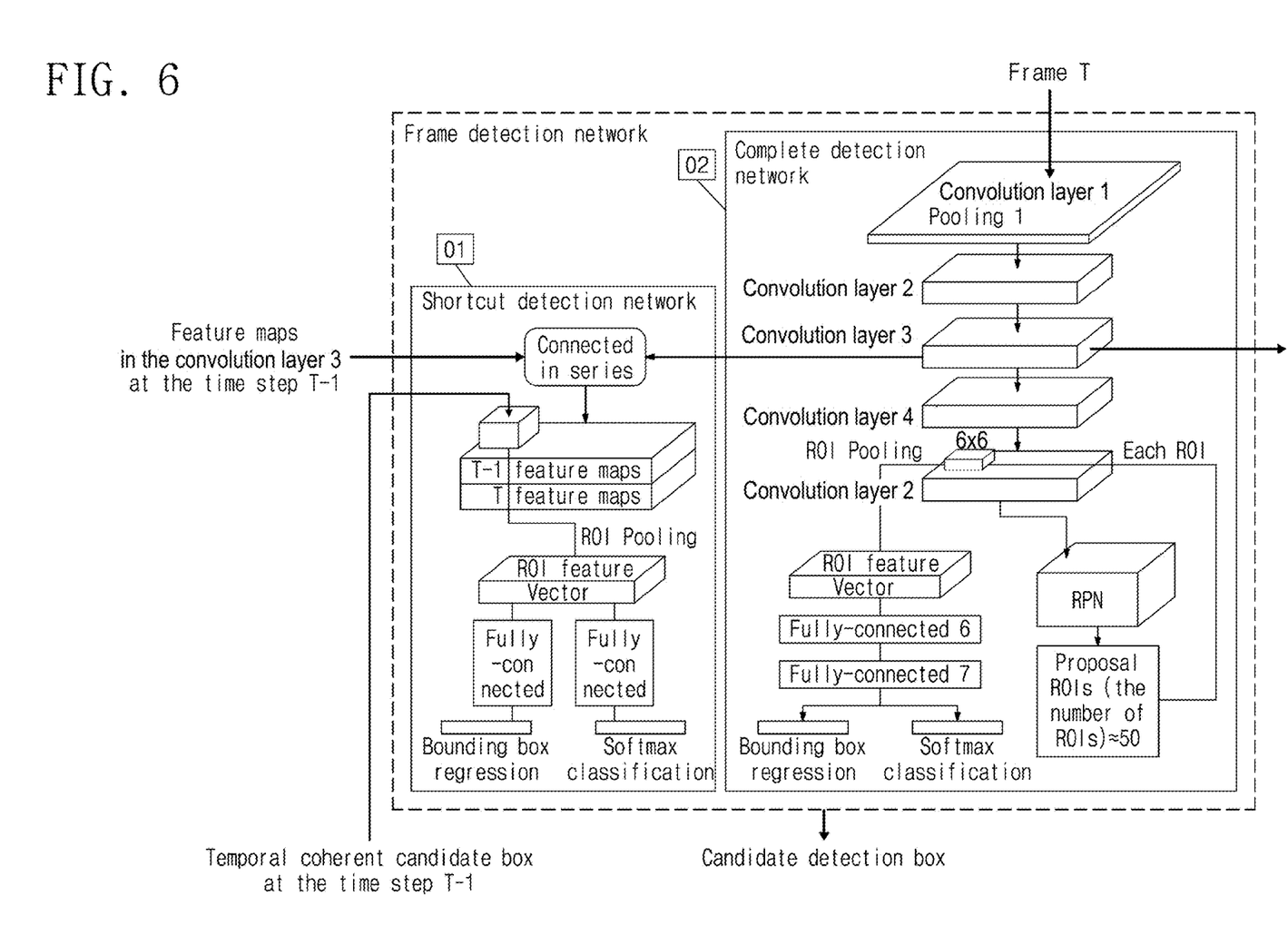
FIG. 6 is a structural block diagram of the frame detection network according to the exemplary embodiment.

Further, the frame detection network is a neural network consisting of two sub-neural networks. As shown in FIG. 6, the two sub-neural networks include: a complete detection network and a shortcut detection network. The frame detection network model generates a candidate detection box of the current frame by using the feature of the current frame image and a temporal coherent candidate box of a previous frame provided by the candidate graph model; and the candidate graph model establishes a graph model based on candidate detection boxes provided by the frame detection network model at each time step, and selects, from the candidate detection boxes of the current frame, a candidate box satisfying a temporal coherency constraint as a result of detection of the current frame.

Specifically, the frame detection network model generates, based on a feature map of the current frame image and a temporal coherent candidate box of a previous frame image generated by the candidate graph model, a candidate detection box of the current frame image.

Figure 7:
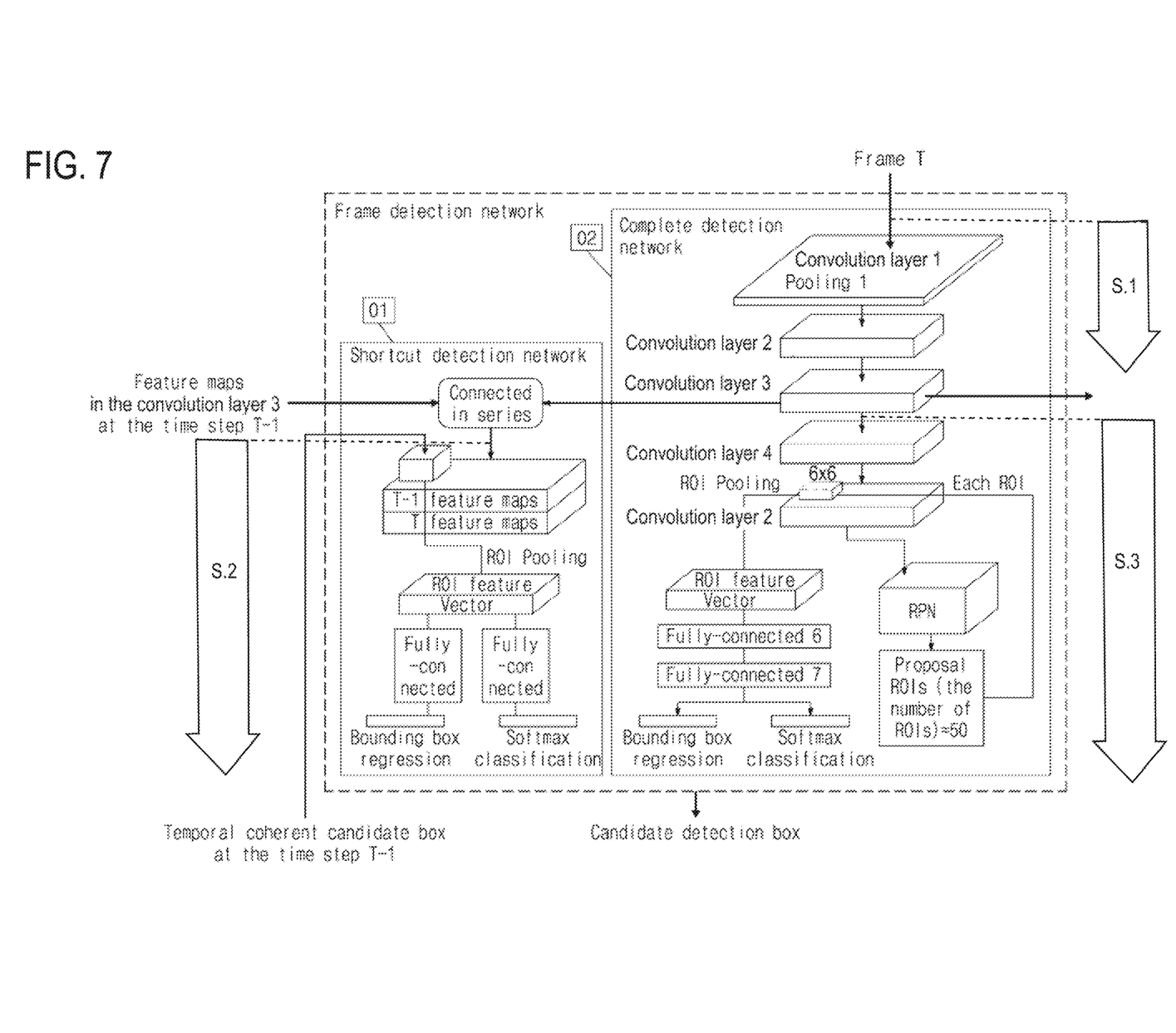
FIG. 7 is a schematic diagram of the implementation process of the frame detection network according to the exemplary embodiment.

FIG. 7 is a schematic diagram of an implementation process of the frame detection network model. The execution operation of generating a candidate detection box of the current frame image includes the following operations:

Operation 1: processing the current frame image by three convolutional layers from the firstconvolutional layer to the second convolutional layer to the third convolutional layer of the complete detection network;

Operation 2: by using a feature map (e.g., first feature map) of the current frame image and a feature map of the previous frame image (e.g., a second feature map) in the third convolutional layer and a result of detection of the previous frame image as an input, performing a processing operation of the shortcut detection network; and Operation 3: if a confidence value predicted by a softmax layer in the shortcut detection network is less than a threshold value, continuously performing the processing operation of the complete detection network from the third convolutional layer, and using an output of the complete detection network, e.g., a complete detection network output, as an output of the frame detection network, e.g., a frame detection network output.

Optionally, if the confidence value predicted by the softmax layer in the shortcut detection network is greater than the threshold value, a result from the shortcut detection network is used as the output of the frame detection network.

To further describe the frame detection network, the two sub-neural networks (i.e., the complete detection network and the shortcut detection network) contained in the frame detection network will be specifically described below.

I. Complete Detection Network

Figure 8:
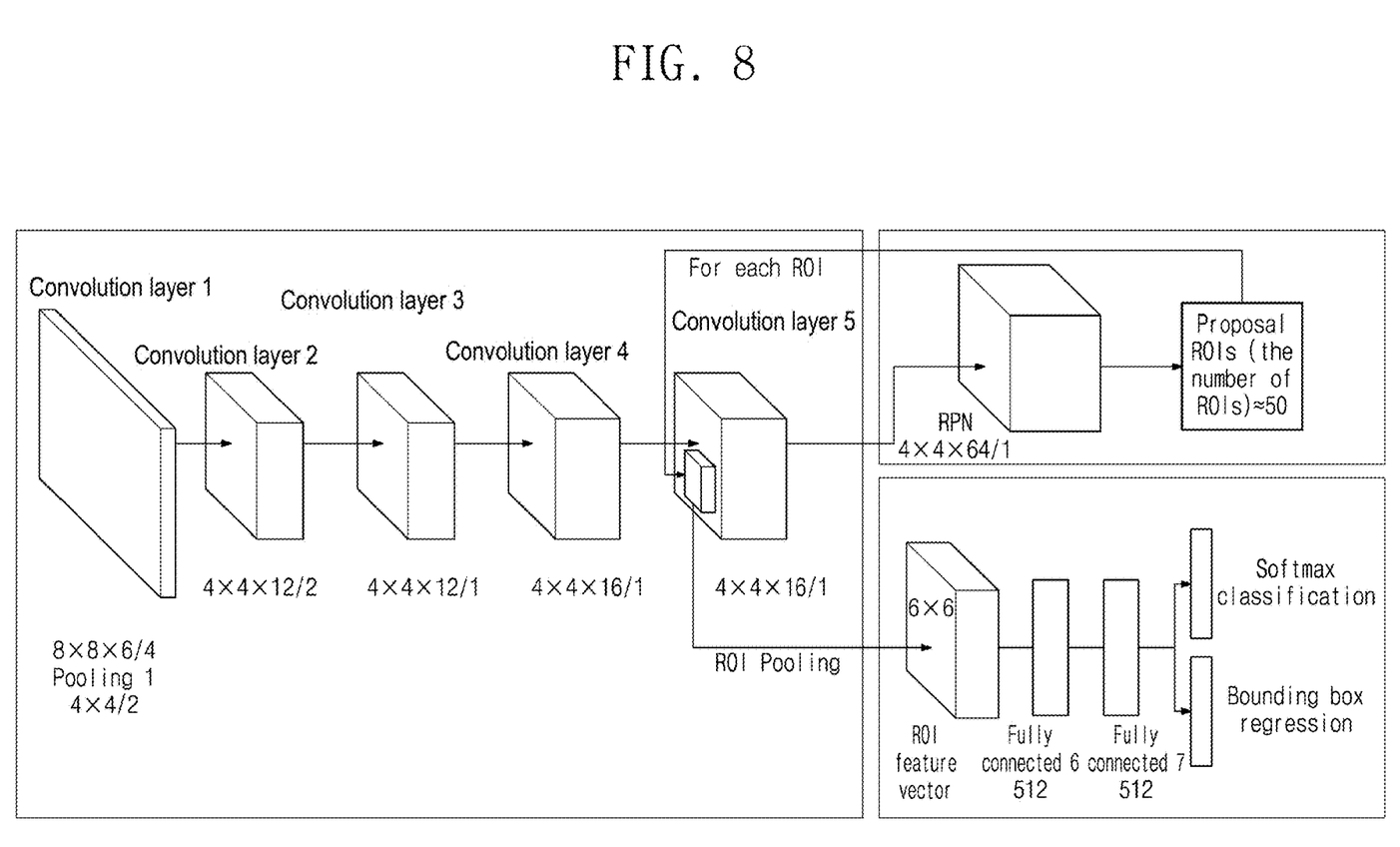
FIG. 8 is a structural block diagram of the complete detection network according to the exemplary embodiment.

As shown in FIG. 8, the input of the complete detection network is the current frame image, while the output thereof is the candidate detection box of the current frame. Specifically, the structure of the complete detection network adopts an FRCNN framework, and the operations of processing an image frame by the complete detection network is as follows:

1. the image is processed by a plurality of convolutional layers and a pooling layer, e.g., a one pooling layer, to obtain a feature map of the image (i.e., convolution 5 in FIG. 8);
2. based on this feature map, candidate boxes are regressed by a Region Proposal Network (RPN), all the regressed candidate boxes are processed by a Non-Maximum Suppression (NMS) algorithm, and the selected candidate box regions are used as proposal ROIs;
3. according to the ROI feature vectors dynamically pooled on the feature maps of the proposal ROIs by the ROI pooling layer, all the dynamically pooled feature vectors of the proposal regions have a fixed length; and
4. finally, each ROI feature vector is processed into two branches by a plurality of fully-connected layers, where one of the branches is a softmax layer used for classifying objects within the ROI, while the other one thereof is used for regressing parameters of a bounding box for the objects.

Based on the characteristics of sparsity and binarization of the DVS image, compared with detection network for an ordinary RGB image (e.g., ZF, VGG or more), the network structure of the complete detection network has less convolution kernels and less convolutional layers, and the first several layers have a large step. Thus, the speed of the complete detection network is greatly improved, and the size of the complete detection network is reduced.

II. Shortcut Detection Network

The position of an object to be detected should be coherent in time domain. In other words, there is only a limited offset between two adjacent frames of the same object. Therefore, the direction of motion of an object can be estimated according to low-level image features of two adjacent frames by a light-weight network, so that the position of the object in the current frame can be obtained from the position of the object in the previous frame.

Therefore, the shortcut detection network is designed as a network having a lighter weight than the complete detection network. The network structure of the shortcut detection network is shown in FIG. 7. The input of the shortcut detection network is feature maps of the previous frame and the current frame in the third convolutional layer, and a result of detection of the previous frame; and the output of the shortcut detection network is a candidate detection box of the current frame. The operation of processing image frames by the shortcut detection network is as follows.

First, feature maps of the previous frame and the current frame in the third convolutional layer are connected in series to obtain a new feature map. Then, the result of detection of the previous frame is used as an ROI, and a feature vector of this ROI is pooled from the new feature map by an ROI pooling layer. Finally, this feature vector is processed by two branches respectively, where one of the branches is used for classifying objects within this ROI by a softmax layer, while the other one thereof is used for regressing parameters for the bounding box for the objects.

Further, the recurrent coherent network in the exemplary embodiment further includes a candidate graph model. The candidate graph model establishes a graph model based on candidate detection boxes at each time step, and uses a candidate detection box (e.g., a first candidate detection box) satisfying a temporal coherency constraint among the candidate detection boxes as a temporal coherent candidate box of the current frame image.

The candidate graph model in the exemplary embodiment is a directed acyclic graph used for tracking an object to be detected. The input of the candidate graph model is the candidate detection boxes output by the frame detection model at each time step, while the output thereof is the final result of detection of the current frame.

The candidate graph model has a plurality of graph layers, each of which corresponds to a frame. Each node in each frame represents a candidate detection box output from the frame detection model. Edges in the drawing represent possible object motions. For example, an edge from a node $vi,T$ to a node $vj,T+1$ represents a possible object motion from a position i to a position j within a time interval from T to T+1. When and only when the candidate positions $vi,T$ and $vj,T+1$ satisfy the temporal coherency constraint, there is an edge from a node $vi,T$ to a node $vj,T+1$. The temporal coherency constraint is defined as:

$$\text{Dist}(\text{Position}(vi,T)-\text{Position}(vj,T+1))<\text{Threshold}$$

In other words, a distance (which can be but not limited to a Euclidean distance or a Manhattan distance) between the position at the time step T+1 and the position at the time step T is less than a first preset threshold value (Threshold). Each path represents a possible object motion trajectory.

At each time step, the graph model will receive a plurality of candidate detection boxes output from the frame detection network. For each candidate detection box, a temporal trajectory of this candidate detection box in the candidate graph model is attempted to extract. If there is a temporal trajectory having a length greater than a second preset threshold value in a candidate box, it is considered that this candidate box has high temporal coherency, wherein the second preset threshold value is a temporal length of the temporal trajectory of the candidate box. All candidate boxes satisfying this constraint are used as a result of detection, and the result of detection is output to the frame detection network at the time step T+1 as temporal coherent candidate boxes.

The extraction of temporal trajectories of a plurality of candidate boxes can be considered as a minimum-flow optimization problem with a constraint, which can be solved by a K-Shortest Path (KSP).

Figure 9:
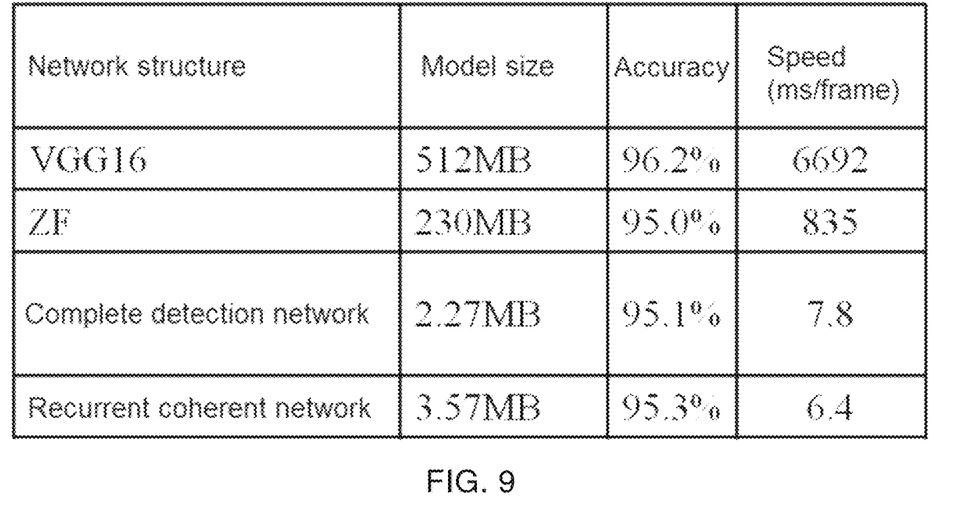
FIG. 9 is a comparison diagram between the object detection method according to the exemplary embodiment and an existing object detection method in results of detection.

FIG. 9 is a comparison diagram between the object detection method according to the exemplary embodiment and an existing object detection method in results of detection, where the results of detection are obtained by running images having a pixel size of 640×480 on an INTEL processor i5-4590. For the corresponding recurrent coherent network in the method provided by the exemplary embodiment, the detection accuracy is 95.3% and the detection speed is 6.4 ms/frame. Compared with other conventional methods, the detection efficiency is improved significantly, and the detection accuracy is also improved.

Figure 10:
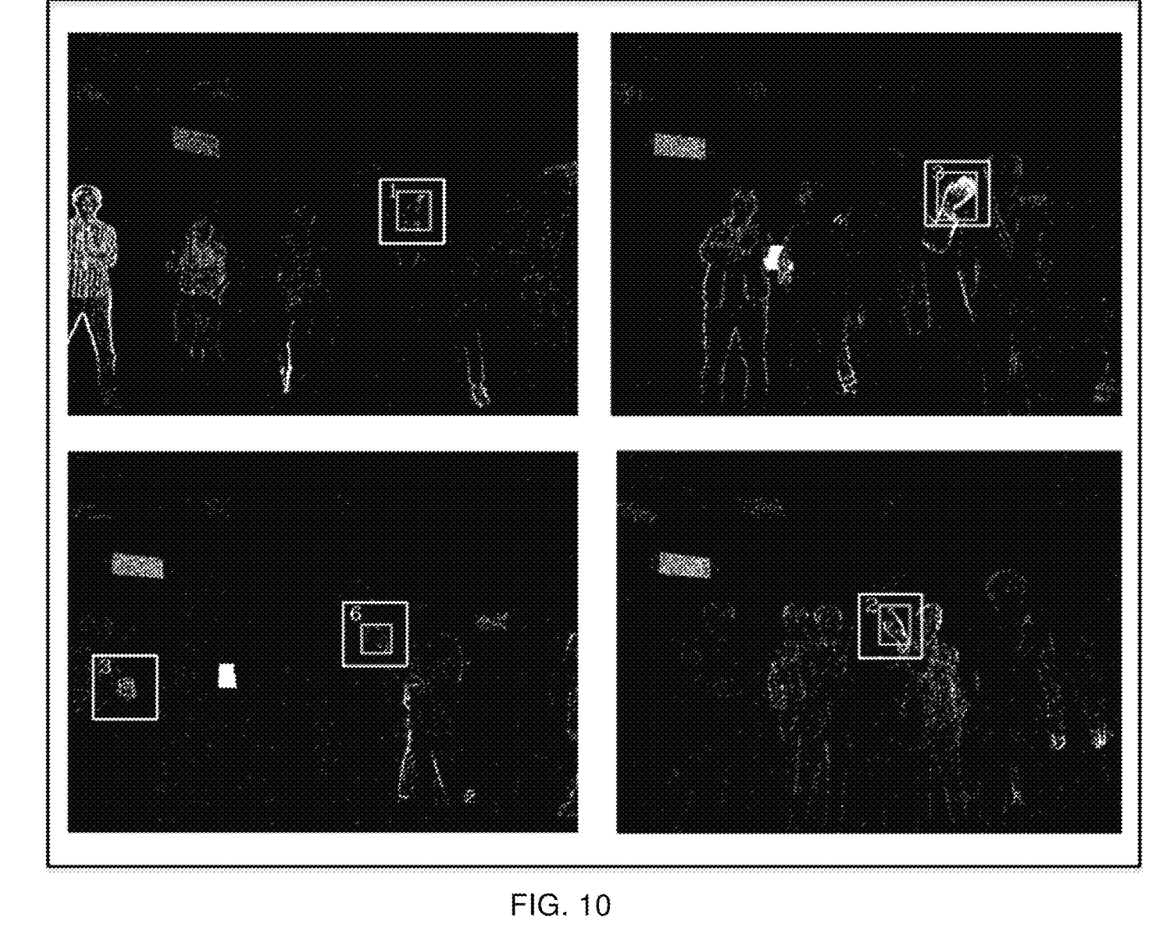
FIG. 10 is a view showing the result of detection of the object detection method according to the exemplary embodiment.

To further exhibit the detection effect of the method provided by the exemplary embodiment, FIG. 10 is an exemplary view of detection effect, wherein the smallest box is the eventually determined candidate box for objects to be detected conforming to the temporal coherency. Apparently, the position of the candidate box determined by the object detection method provided by the exemplary embodiment is very accurate.

Embodiment 2

Figure 11:
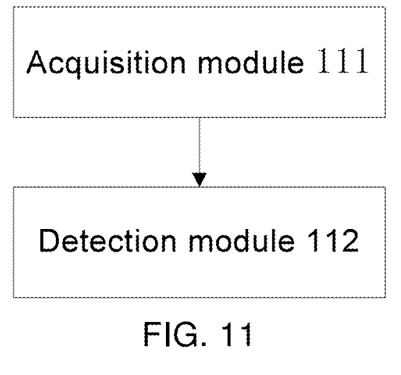
FIG. 11 is a structural block diagram of an object detection apparatus based on a DVS according to Another exemplary embodiment.

Referring to FIG. 11, Another exemplary embodiment provides an object detection apparatus based on a Dynamic Vision Sensor (DVS), including an acquisition module 111 and a detection module 112, wherein:

the acquisition module 111 is configured to acquire a plurality of image frames by a DVS; and the detection module 112 is configured to detect the image frames by a recurrent coherent network to acquire a candidate box for objects to be detected, wherein the recurrent coherent network including a frame detection network model and a candidate graph model. There may be at least one processor which implements the acquisition module 111, the detection module 112, or both.

In the solutions of the exemplary embodiment, the specific function implementation of each module in the object detection apparatus based on a DVS provided in Embodiment 2 can refer to the specific operations of the object detection method based on a DVS provided in Embodiment 1, and will not be repeated here.

In conclusion, according to the characteristics of the DVS camera and in combination with the temporal information, the exemplary embodiment constructs a novel recurrent coherent network for detecting objects in image frames, so that the detection accuracy can be ensured and the detection speed can be improved greatly.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

What is claimed is:

1. An object detection method based on a Dynamic Vision Sensor (DVS) comprising:
   acquiring a plurality of frame images by the DVS, wherein the plurality of frame images include a current frame image and a previous frame image; and
   detecting the plurality of frame images by a recurrent coherent network to acquire a candidate detection box for objects to be detected,
   wherein the recurrent coherent network comprises a frame detection network model and a candidate graph model, the frame detection network model comprising a complete detection network and a shortcut detection network, and
   wherein the detecting further comprises:
      obtaining a confidence value from the shortcut detection network using a first feature map of the current frame image and a second feature map of the previous frame image and a result of detection of the previous frame image as an input of the shortcut detection network, and
      controlling, based on the confidence value, a use of an output of the complete detection network.

2. The object detection method based on the DVS of claim 1, wherein the frame detection network model generates, based on a feature map of the current frame image and a temporal coherent candidate box of a previous frame image generated by the candidate graph model, the candidate detection box of the current frame image.

3. The object detection method based on the DVS of claim 1, wherein the frame detection network model generates the candidate detection box of a current frame image by:
   processing by the complete detection network, the current frame image by three convolutional layers, the three convolutional layers comprising a first convolutional layer, a second convolutional layer, and a third convolutional layer;
   and
   if the confidence value is less than a threshold value, wherein the confidence value is predicted by a softmax layer in the shortcut detection network, resuming the processing operation by the complete detection network from the third convolutional layer, and using a complete detection network output as a frame detection network output.

4. The object detection method based on the DVS of claim 3, wherein if the confidence value predicted by the softmax layer in the shortcut detection network is greater than the threshold value, a result from the shortcut detection network is used as an output of a frame detection network.

5. The object detection method based on the DVS of claim 4, wherein the processing operation of the shortcut detection network comprises:
   connecting the second feature map of the previous frame image and the first feature map of the current frame image in series to obtain an updated feature map of the current frame image;
   using a region of the candidate detection box of the previous frame image as a Region of Interest (ROI), and pooling a feature vector of the ROI from the updated feature map by an ROI pooling layer; and
   processing the feature vector of the ROI to obtain detection information.

6. The object detection method based on the DVS of claim 5, wherein the detection information comprises parameters for describing the candidate detection box and classification identifier information of the objects to be detected.

7. The object detection method based on the DVS of claim 6, wherein the parameters for describing the candidate detection box and the classification identifier information of the objects to be detected are obtained by processing the feature vector of each proposal ROI, after through a fully-connected layer, by a bounding box regression layer and the softmax layer, respectively.

8. The object detection method based on the DVS of claim 3, wherein the processing by the complete detection network comprises:
   processing the current frame image by the three convolutional layers and a one pooling layer to obtain the first feature map of the current frame image;
   based on the first feature map of the current frame image, regressing the first feature map of the current frame image by a Region Proposal Network (RPN) to obtain a regressed candidate box for the current frame image;
   processing the regressed candidate box for the current frame image by a non-maximum suppression algorithm to obtain proposal ROIs;
   dynamically pooling the first feature map of the current frame image by an ROI pooling layer to obtain feature vectors of the proposal ROIs; and
   processing the feature vectors of the proposal ROIs to obtain detection information.

9. The object detection method based on the DVS of claim 8, wherein each of the feature vectors of the proposal ROIs has a fixed length.

10. The object detection method based on the DVS of claim 1, wherein the candidate graph model establishes a graph model based on candidate detection boxes at each time step, and uses a first candidate detection box satisfying a temporal coherency constraint among the candidate detection boxes as a temporal coherent candidate box the current frame image.

11. The object detection method based on the DVS of claim 10, wherein the temporal coherency constraint means that a distance between a previous position of an object to be detected at a previous time step and a current position of the object to be detected at a current time step, is less than a first preset threshold value.

12. The object detection method based on the DVS of claim 11, wherein the distance is a Euclidean distance or a Manhattan distance.

13. The object detection method based on the DVS of claim 10, wherein when there is a temporal trajectory having a length greater than a second preset threshold value in the first candidate detection box, the first candidate detection box satisfies the temporal coherency constraint.

14. The object detection method based on the DVS of claim 1, wherein the candidate graph model comprises a plurality of graph layers which correspond to at least some of the plurality of frame images.

15. The object detection method based on the DVS of claim 1, wherein the detecting the plurality of frame images is performed by at least one processor.

16. An object detection apparatus based on a Dynamic Vision Sensor (DVS), the object detection apparatus comprising:
at least one processor configured to implement:
an acquisition module configured to acquire a plurality of frame images by the DVS, wherein the plurality of frame images include a current frame image and a previous frame image; and
a detection module configured to detect the plurality of frame images by a recurrent coherent network to acquire a candidate box for objects to be detected, wherein the recurrent coherent network comprises a frame detection network model and a candidate graph model, the frame detection network model comprising a complete detection network and a shortcut detection network, and
wherein the detection module is further configured to:
obtain a confidence value from the shortcut detection network using a first feature map of the current frame image and a second feature map of the previous frame image and a result of detection of the previous frame image as an input of the shortcut detection network, and
control, based on the confidence value, a use of an output of the complete detection network.

* * * * *